United States Patent
Welch

(10) Patent No.: US 10,549,479 B2
(45) Date of Patent: Feb. 4, 2020

(54) SYSTEM AND METHOD FOR SPIN WELDING FITTINGS TO MAPLE SAP LINES

(71) Applicant: LES ÉQUIPMENTS D'ÉRABLIÈRE CDL INC., St-Lazare-de-Bellechasse (CA)

(72) Inventor: Charles Welch, Wyoming, NY (US)

(73) Assignee: LES ÉQUIPMENTS D'ÉRABLIÈRE CDL INC. (CA)

( * ) Notice: Subject to any disclaimer, the term of this patent is extended or adjusted under 35 U.S.C. 154(b) by 322 days.

(21) Appl. No.: 15/496,064

(22) Filed: Apr. 25, 2017

(65) Prior Publication Data

US 2018/0043623 A1  Feb. 15, 2018

Related U.S. Application Data

(60) Provisional application No. 62/374,349, filed on Aug. 12, 2016.

(51) Int. Cl.
*B32B 37/00* (2006.01)
*B29C 65/06* (2006.01)
*A01G 23/14* (2006.01)

(52) U.S. Cl.
CPC .......... *B29C 65/0672* (2013.01); *A01G 23/14* (2013.01)

(58) Field of Classification Search
CPC ...... B29C 65/06; B29C 65/0672; A01G 23/14

USPC ....................................................... 156/73.5
See application file for complete search history.

(56) References Cited

U.S. PATENT DOCUMENTS

| | | | | |
|---|---|---|---|---|
| 5,152,855 A | * | 10/1992 | Jansman | A61M 25/0009 156/580.2 |
| 6,068,038 A | * | 5/2000 | Kawaura | B23K 20/12 156/580 |
| 6,902,208 B1 | * | 6/2005 | Mobley | B29C 65/02 285/331 |

* cited by examiner

*Primary Examiner* — James D Sells
(74) *Attorney, Agent, or Firm* — Lavery, De Billy, LLP; Gunzalo Lavin

(57) ABSTRACT

A maple sap line system and method for spin welding provides secure, unobstructed lines for collecting sap by creating a hermetically sealed connection between a lateral line and a mainline. A fitting connects the mainline to the lateral line. The fitting is spin welded to the mainline at a contact interface. The fitting comprises a protruding member that easily melts to create the frictional weld. The fitting has an elongated body comprising barbs that receive the lateral line. The fitting has a channel that enables fluid communication between the mainline and the lateral line. The flanges in the fitting register with a chuck to rotate the fitting against the main line at a high rpm. Molten debris formed in the channel is dislodged by drilling with a collared drill. The drilling provides fluid communication and creates a smooth inner surface in the mainline, and cuts off flanges from the fitting.

19 Claims, 11 Drawing Sheets

SYSTEM AND METHOD FOR SPIN WELDING FITTINGS TO MAPLE SAP LINES

CROSS REFERENCE TO RELATED APPLICATIONS

This application claims benefit, under 35 U.S.C. § 119(e), of U.S. provisional application Ser. No. 62/374,349, filed on Aug. 12, 2016. All documents above are incorporated herein in their entirety by reference.

FIELD OF THE INVENTION

The present invention relates generally to a system and method for spin welding fittings to maple sap lines.

BACKGROUND OF THE INVENTION

Those skilled in the art will recognize that traditionally, maple sap was collected in buckets at the tap source. The sap was then stored in a tank before being transported for processing. Over the years, a variety of specialized hardware has been developed for this task, including both sap spouts and specialized sap collection buckets or bags.

It is also known in the art that a tubing system has replaced the traditional bucket collection system. The tubing system typically includes spouts that plug directly into the maple tree (usually ¹⁹⁄₆₄", ⁵⁄₁₆" or ⁷⁄₁₆" outside diameter) and plastic tubing droplines (usually ⁵⁄₁₆" inside diameter and about 18" to 40" in length) connected to the various spouts. The droplines are then connected to lateral lines (usually from ³⁄₁₆ to ⁵⁄₁₆" inside-diameter plastic tubing) that run between multiple maple trees. The lateral lines are in turn connected to at least one mainline (usually ¾" to 2" diameter) that run to a maple sap processing plant. Each lateral line is connected to the main line with a connecting fitting.

The problem with this prior art assembly is that the connecting fitting is made up of multiple parts and clamps around the mainline providing a mechanical seal. This style fitting often loosens due to freezing conditions or mechanical stress, which causes leakage to occur.

SUMMARY OF THE INVENTION

According to the present invention, there is provided a maple sap line system and method for spin welding that provides secure, unobstructed lines for collecting sap by creating a hermetically sealed connection between a lateral line and a mainline. A fitting connects the mainline to the lateral line. The fitting is spin welded to the mainline at a contact interface. The fitting comprises a protruding member that easily melts to create the frictional weld. The fitting has an elongated body comprising barbs that receive the lateral line. The fitting has a channel that enables fluid communication between the mainline and the lateral line. The flanges in the fitting register with a chuck to rotate the fitting against the main line at a high rpm. Molten debris formed in the channel is dislodged by drilling with a collared drill. The drilling provides fluid communication and creates a smooth inner surface in the mainline, and cuts off flanges from the fitting.

Advantageously, the system and method for spin welding maple sap lines creates a secure connection and unobstructed fluid communication between a lateral line that runs to a maple tree to collect maple sap and a mainline that carries the maple sap to a processing plant; whereby a barbed fitting is spin welded to the mainline and then coupled to the lateral line; whereby after welding, a drill removes molten debris from a channel in the fitting; whereby the drill cuts off flanges on the fitting to provide visual indication that the connection is secure, and that the channel is open for the flow of maple sap.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
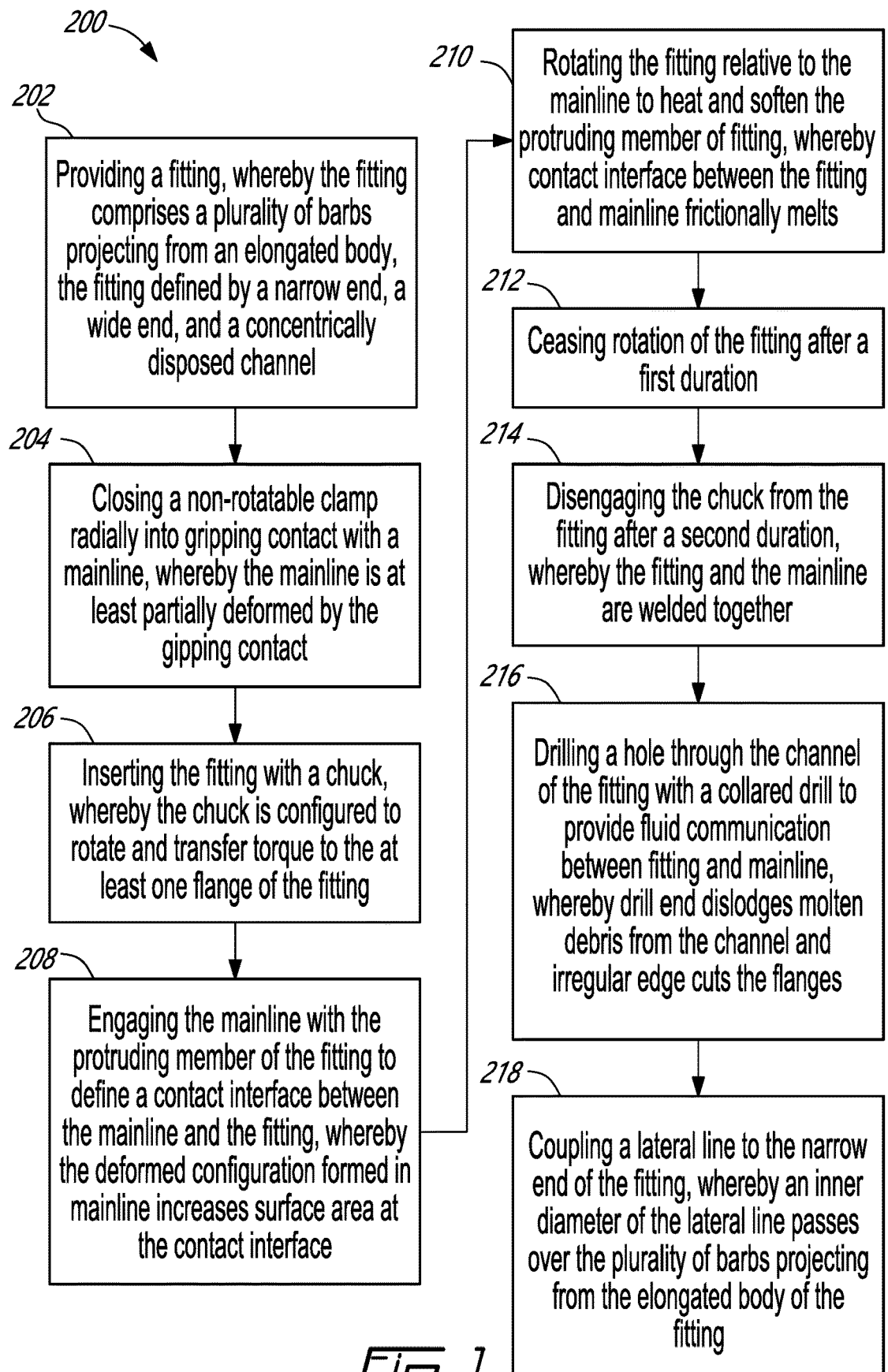
FIG. 1 is a flowchart of an exemplary method for spin welding maple sap lines, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 2.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention presented in FIGS. 1-11, a maple sap line system 100 and method 200 for spin welding maple sap lines enables formation of secure, unobstructed lines for collecting and transporting maple sap from a maple tree to a sap processing plant. The system 100 and method 200 creates a hermetically sealed connection between a lateral line 140 that runs to a maple tree to collect maple sap, and a mainline 116 that carries the maple sap from the lateral line 140 to a processing plant. The welding results in an unobstructed inner surface 118 at the junction between the mainline 116 and lateral line 140, which optimizes the free flow of maple sap.

In some embodiments, system 100 utilizes a fitting 102 to connect mainline 116 to lateral line 140. Fitting 102 may include a one-piece thermoplastic connector that is simply designed and inexpensive to manufacture. Fitting 102 is spin welded to the mainline 116 at a contact interface 120 between mainline 116 and fitting 102. A clamp 138 immobilizes mainline 116 as fitting 102 is rotated against contact interface 120. Clamp 138 creates a gripping contact that deforms mainline 116, so as to increase surface area of contact interface 120, and thereby enhance spin welding process.

In one embodiment, fitting 102 comprises a protruding member 112 that is configured to melt easily. It should be understood the entire fitting is molded out of the same material and has the same melting point. The shape and mass of the end of the protruding member is what allows it to melt before the main body of the mainline 116. This is configured to create a frictional weld with mainline 116 at contact interface 120. Fitting 102 also has a concentrically disposed channel 142 that enables fluid communication between mainline 116 and lateral line 140, and also provides a vent for molten debris to escape during the spin welding process. Fitting 102 also comprises a plurality of barbs 110a, 110b that receive an inner diameter of the lateral line 140 to create a secure connection with lateral line 140.

During the spin welding process, fitting 102 utilizes at least one flange 114a, 114b that registers with a ridge in chuck 134. As chuck 134 rotates, torque is transferred from the ridge 134 to the flange 114a, 114b, which rotates fitting 102 against mainline 116 at a high rate of rotations per minute. The spin welding may produce molten debris inside channel 142 of the fitting 102, especially near the contact interface 120 and inside the channel 142. The molten debris is dislodged by drilling through the channel 142 with a collared drill 122.

Collared drill 122 has a drill end 124 that passes through channel, contact interface 120, and mainline 116 to create a smooth inner surface 118 in mainline 116. Furthermore, while drilling through channel 142, an irregular edge of collared drill 122 simultaneously cuts off flange 114a, 114b. Removal of flange 114a, 114b is important in that it provides a visual indication that the junction between mainline 116 and lateral line 140 is hermetically sealed, and that the channel is cleared for free flow of maple sap. After spin welding with mainline 116, fitting 102 also forms a secure connection with a lateral line 140. In this manner, there is unobstructed fluid communication between mainline 116 and lateral line 140.

Those skilled in the art will recognize that traditionally, maple sap was collected in buckets at the tap source. The sap was then stored in a tank before being transported for processing. Over the years, a variety of specialized hardware has been developed for this task, including both sap spouts and specialized sap collection buckets or bags.

It is also known in the art that a tubing system has replaced the traditional bucket collection system. The tubing system typically includes spouts that plug directly into the maple tree (usually $^{19}\!/_{64}$", $^{5}\!/_{16}$" or $^{7}\!/_{16}$" outside diameter) and plastic tubing droplines (usually $^{5}\!/_{16}$" inside diameter and about 18" to 40" in length) connected to the various spouts. The droplines are then connected to lateral lines (usually from $^{3}\!/_{16}$ to $^{5}\!/_{16}$" inside-diameter plastic tubing) that run between multiple maple trees. The lateral lines are in turn connected to at least one mainline (usually $^{3}\!/_{4}$" to 2" diameter) that run to a maple sap processing plant. Each lateral line is connected to the main line with a connecting fitting.

The problem with this assembly is that the connecting fitting is made up of multiple parts and clamps around the mainline providing a mechanical seal. This style fitting often loosens due to freezing conditions or mechanical stress, which causes leakage to occur. Inappositely, the disclosed system 100 utilizes a unique fitting 102 to create a junction between mainline 116 and lateral line 140 that is secure, easy to install in the field, and forms a hermetic seal between mainline 116 and lateral line 140. Minimal wires, tools, and expenses are required for the system 100.

FIG. 1 illustrates a flowchart of an exemplary method 200 for spin welding maple sap lines. Method 200 comprises an initial Step 202 of providing a fitting 102, whereby the fitting 102 comprises a plurality of barbs 110a, 110b projecting from an elongated body 106, each barb 110a, 110b facing in a direction and being adapted for resisting axial movement of the fitting 102, the fitting 102 defined by a narrow end 104, a wide end 108, and a concentrically disposed channel 142, the wide end 108 comprising at least one flange 114a, 114b and a protruding member 112 configured to melt before the main body of the fitting 102.

Figure 2:
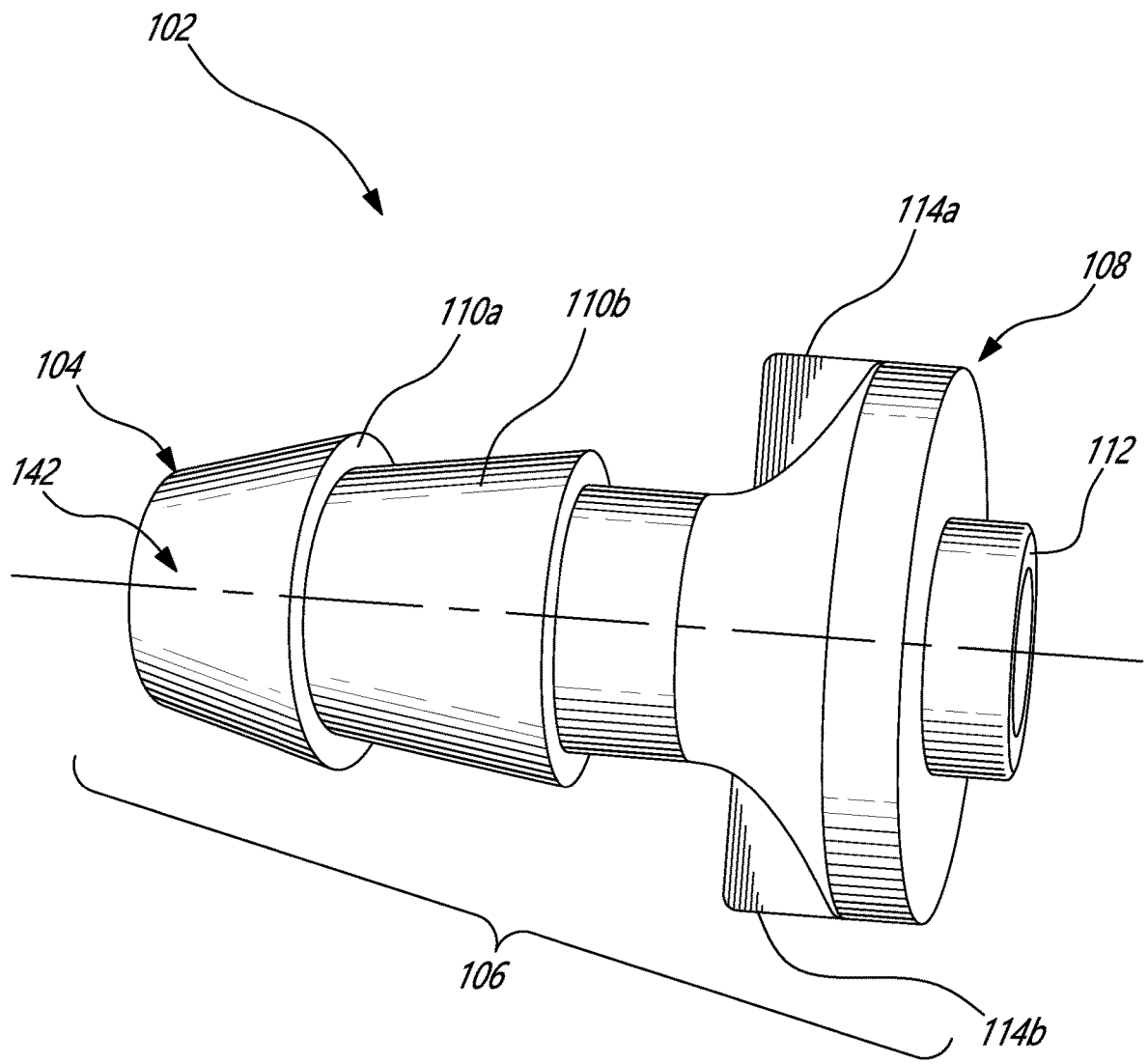
FIG. 2 is a perspective view of an exemplary fitting, in accordance with an embodiment of the present invention.

As FIG. 2 shows, fitting 102 comprises an elongated, thermoplastic connection component that serves as the nexus between mainline 116 and lateral line 140. Fitting 102 has an elongated body 106 having an outer diameter and a plurality of barbs 110a, 110b. The outer diameter may be sized to receive the lateral line 140, approximately between about $^{3}\!/_{16}$" to $^{5}\!/_{16}$ inch" inside diameter. Barbs 110a, 110b along elongated body 106 may face in a direction for resisting axial movement of the fitting 102. In this manner, barbs 110a, 110b form a snug coupling mechanism with lateral line 140, as the lateral line 140 is passed over barbs 110a, 110b, after the spin welding and drilling processes are complete.

Fitting 102 further comprises a concentrically disposed channel 142. Channel 142 serves two primary purposes. The first is to provide a vent path for excess molten debris during the spin welding process. The second is to provide a connection path to lateral line 140 for sap and air after fitting 102 is welded onto mainline 116.

Fitting 102 further comprises a wide end 108 having a protruding member 112 that melts easier than the other regions of the fitting 102. Protruding member 112 is the vanguard for engaging mainline 116 at the contact interface 120, since the protruding member creates the friction welding interaction through the contact interface 120. Wide end 108 further comprises flange 114a, 114b that registers with a ridge in the chuck 134 of motor 144. The rotation of chuck 134 causes the ridge to transfer torque to flange 114a, 114b; and thereby the fitting 102. Suitable materials for fitting 102 may include, without limitation, a high density polyethylene, a medium density polyethylene, and a low density polyethylene.

Figure 3:
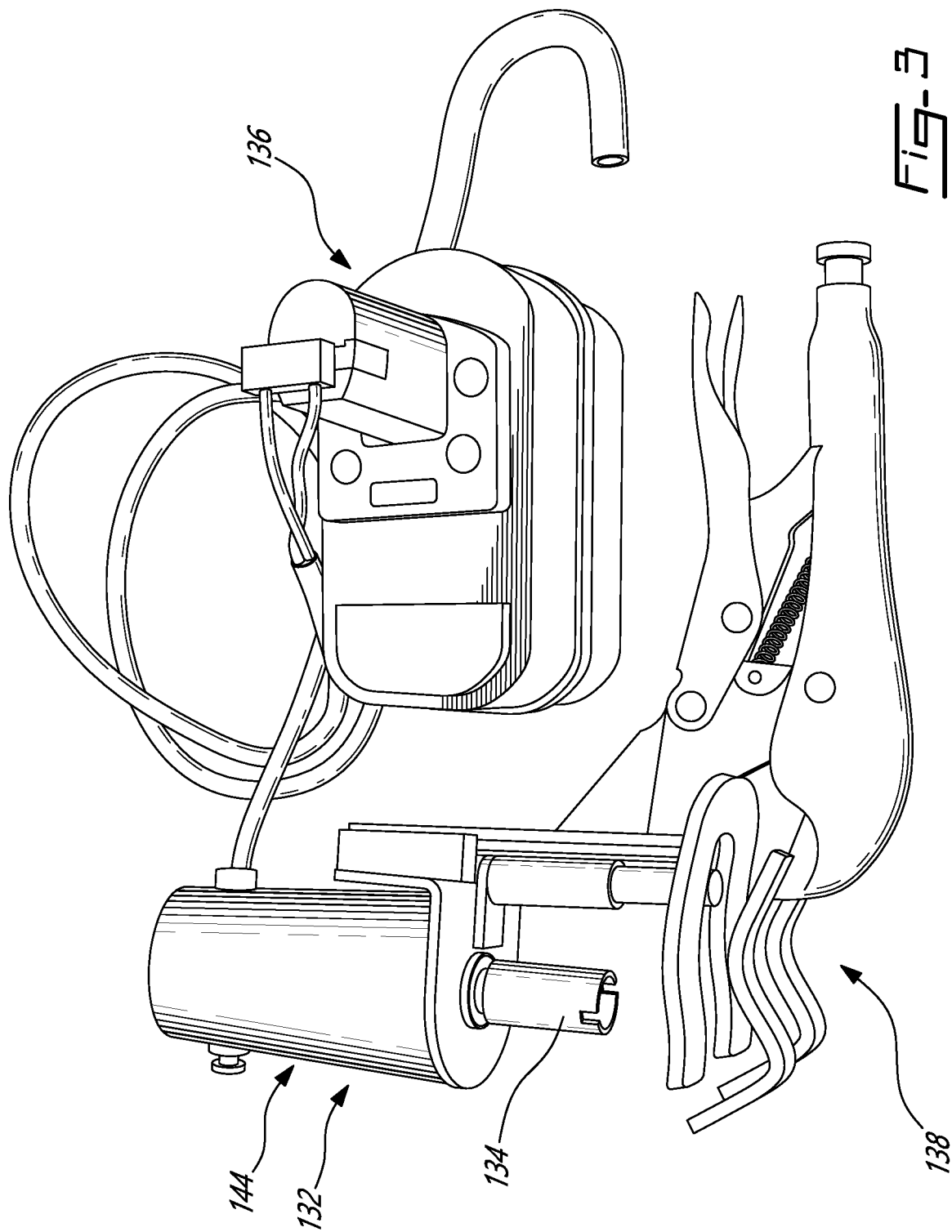
FIG. 3 is a perspective view of an exemplary clamp and chuck, in accordance with an embodiment of the present invention.
Figure 4:
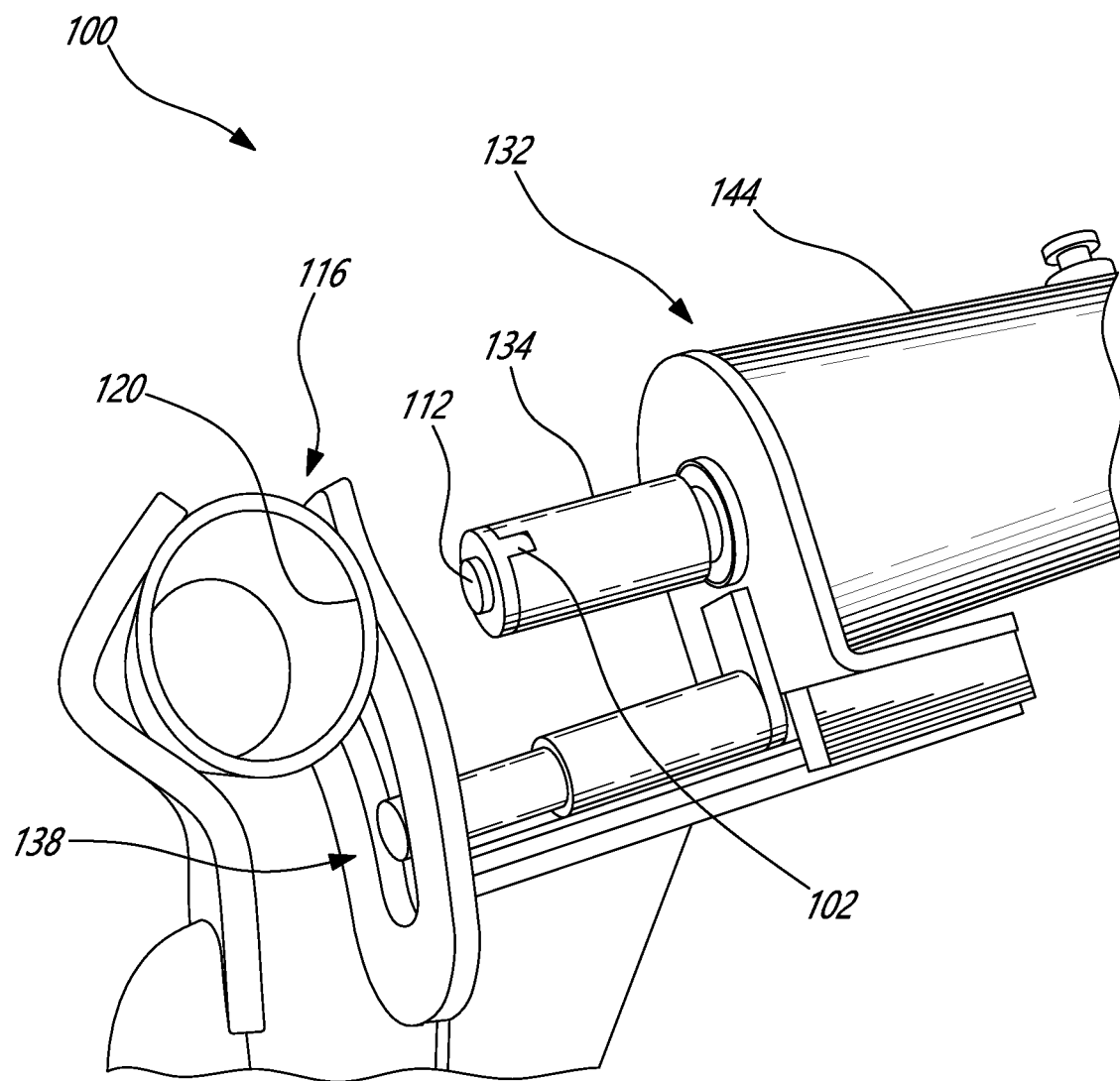
FIG. 4 is a perspective view of an exemplary maple line system, where a clamp holds a mainline, and a chuck rotates a fitting, in accordance with an embodiment of the present invention.

A Step 204 may include using an installation tool 132 for closing a non-rotatable clamp 138 radially into gripping contact with a mainline 116, whereby the mainline 116 is at least partially deformed by the gipping contact. As FIG. 3 illustrates, clamp 138 may include a pair of radially gripping members that hold or secure mainline 116 to prevent movement through the application of inward pressure. Clamp 138 may be operable through manual gripping of a vice grip. Though any clamp 138-mechanism known in the art of lathes and mills may also be used.

The gripping contact formed by clamp 138 is useful for two purposes. The first is that fitting 102 can rotate about a stable mainline 116 to create a clean connection. The second is that the gripping contact deforms mainline 116 to create a generally flat surface. The flat surface formed on the mainline 116, shown in FIG. 4, increases the surface area of contact interface 120 to enhance the spin welding process.

Looking at FIG. 3, another Step 206 for using installation tool 132 includes inserting the fitting 102 within a chuck 134, whereby the chuck 134 is configured to rotate and transfer torque to the at least one flange 114a, 114b of the fitting 102. Chuck 134 is configured to hold the fitting 102 with radial symmetry during alignment and rotational engagement with contact interface 120 of the mainline 116. Installation tool 132 is powered by a power source 136, such as a battery 136. A motor 144 may be actuated to rotate chuck 134. In one embodiment, chuck 134 rotates at about 20,000 rotations per minute. Chuck 134 comprises a sleeve that receives the fitting 102. A ridge is disposed inside the sleeve to engage flange 114a, 114b from fitting 102. The ridge registers with the flange 114a, 114b in a tight, interlocking connection that rotates the fitting 102 at the same speed as the chuck 134, so as to optimize the frictional weld between the protruding member 112 and the mainline 116.

Figure 5:
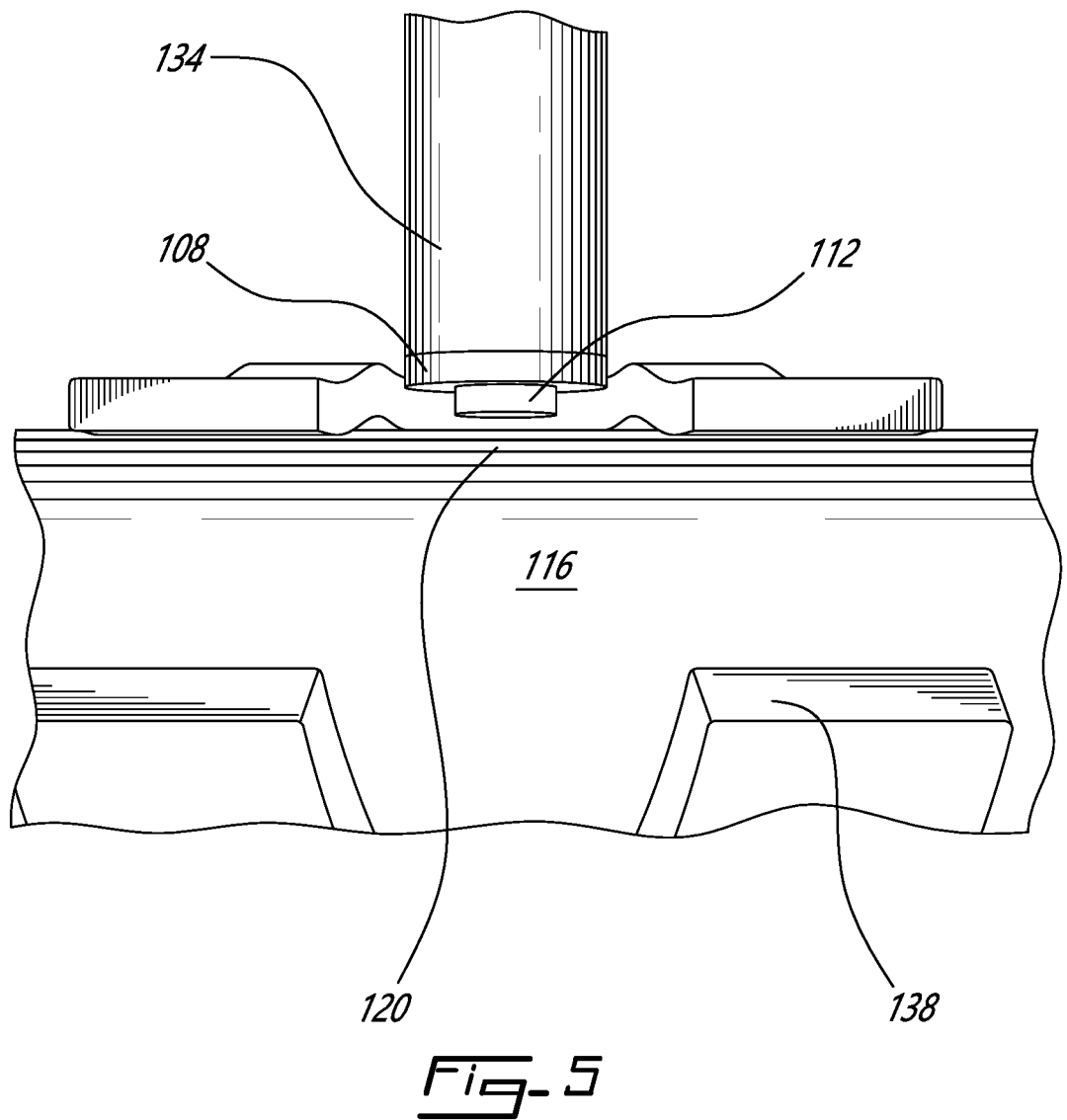
FIG. 5 is a perspective view of a chuck holding a fitting over a contact interface with a mainline, in accordance with an embodiment of the present invention.

As FIG. 5 shows, the method 200 may also include a Step 208 of engaging the mainline 116 with the protruding member 112 of the fitting 102 to define a contact interface 120 between the mainline 116 and the fitting 102, whereby the deformed configuration formed in the mainline 116 by the non-rotatable clamp 138 increases the surface area at the contact interface 120. Protruding member 112 at the wide end 108 of the fitting 102 extends from the chuck 134, so as to engage mainline 116 during spin welding. The protruding member 112 is aligned at the desired contact interface 120 prior to rotating fitting 102 in the chuck 134. Furthermore, the deformed, or flattened surface area of mainline 116 helps form the alignment therebetween.

Figure 6:
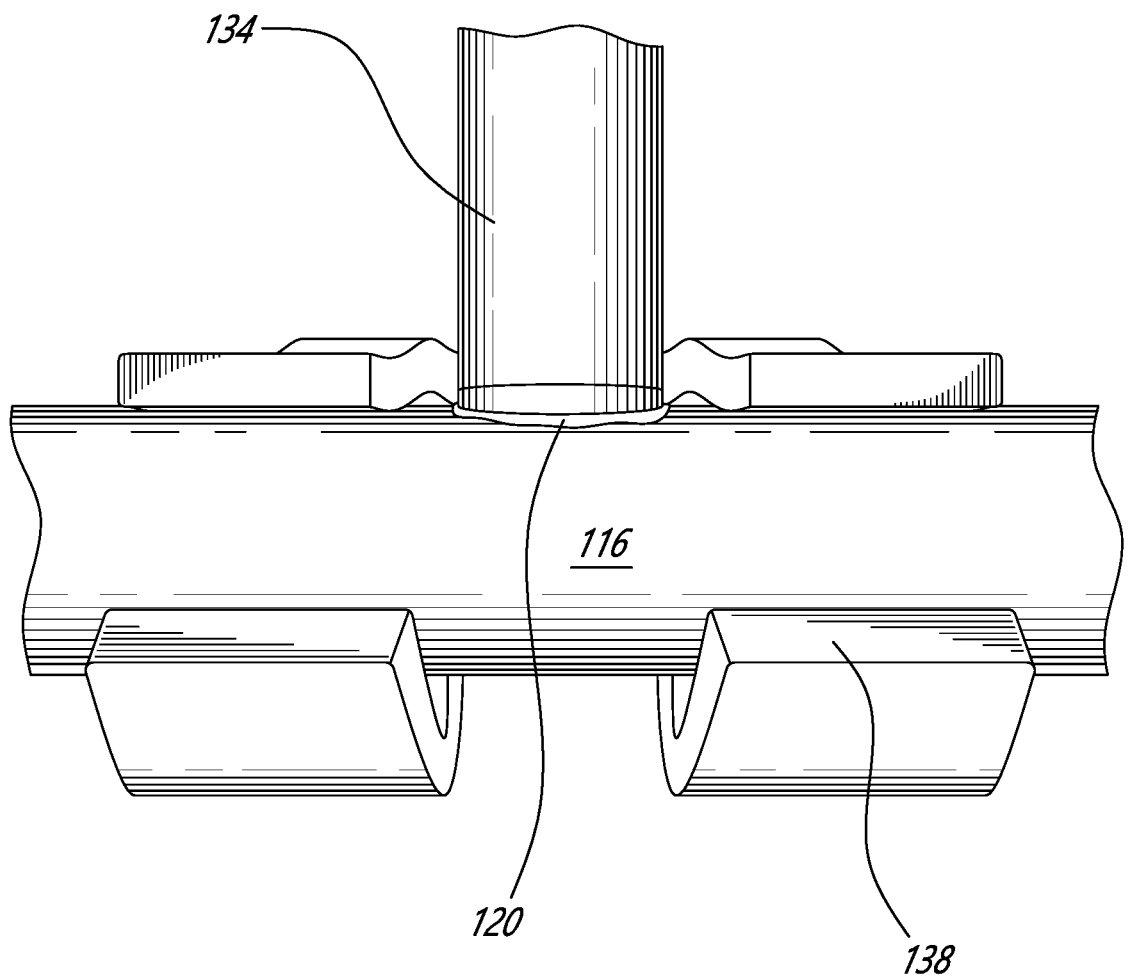
FIG. 6 is a perspective view of a chuck rotating a fitting through a contact interface of a mainline during spin welding, in accordance with an embodiment of the present invention.

Turning now to FIG. 6, a Step 210 includes rotating fitting 102 relative to mainline 116 to heat and soften protruding member 112 of the fitting 102, whereby the contact interface 120 between fitting 102 and mainline 116 frictionally melts. Protruding member 112 and contact interface 120 at mainline 116 melt as a result of the heat and friction produced through high speed rotation of fitting 102 against the clamped mainline 116. In some embodiments, the rotational speed and the material of fitting 102 may be adjusted to vary the type of spin welding or the speed at which the frictional melting occurs.

A Step 212 comprises ceasing rotation of the fitting 102 and continuing fitting engagement 120 after a first duration by maintaining pressure between the fitting and the mainline until the plastic hardens. After molten debris is seen oozing from contact interface 120 of the fitting 102, the rotation of chuck 134 is ceased. In one embodiment, the first duration is about 3 seconds. Though, the material of the fitting 102 and the speed of the rotation may increase or decrease the first duration.

Another Step 214 may include disengaging the chuck 134 from the fitting 102 after a second duration, whereby the fitting 102 and the mainline 116 are welded. A slight pressure may be applied to the side of fitting 102 to determine if the weld is sufficiently strong to maintain the connection with mainline 116. The second duration may be about 3 seconds. Though, the material of fitting 102 and the speed of the rotation may increase or decrease the second duration.

Figure 7:
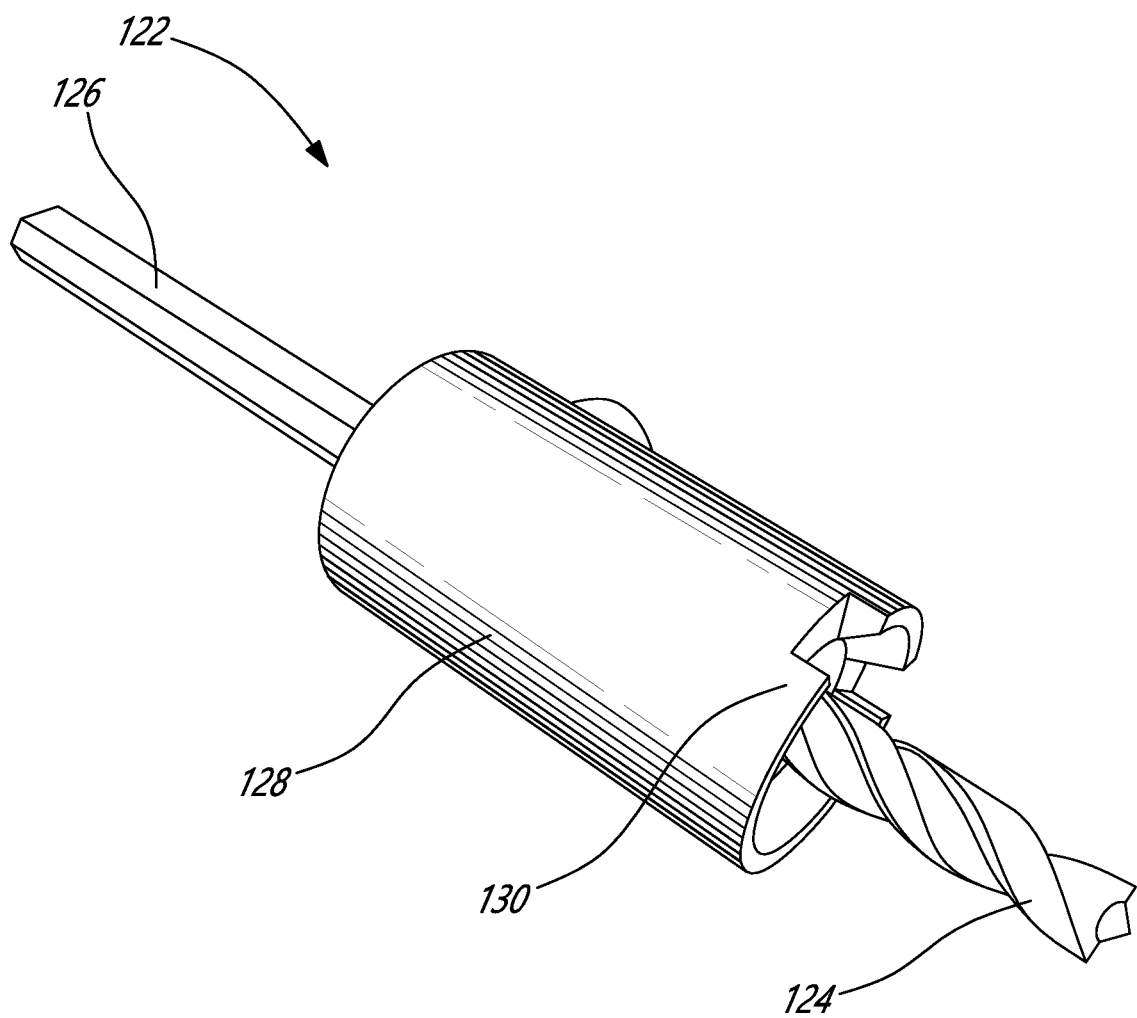
FIG. 7 is a perspective view of an exemplary collared drill, in accordance with an embodiment of the present invention.

Turning now to FIG. 7, a Step 216 comprises drilling a hole through the channel 142 of the fitting 102 with a collared drill 122, the collared drill 122 defined by a drill end 124, a mount end 126, and a collar 128 having an irregular edge 130, whereby the drill end 124 is configured to dislodge molten debris produced from heating and softening the protruding member and provides fluid communication by creating a channel through the fitting and into the mainline whereby the irregular edge 130 is configured to cut the flange 114a, 114b from the wide end 108 of the fitting 102.

Figure 8:
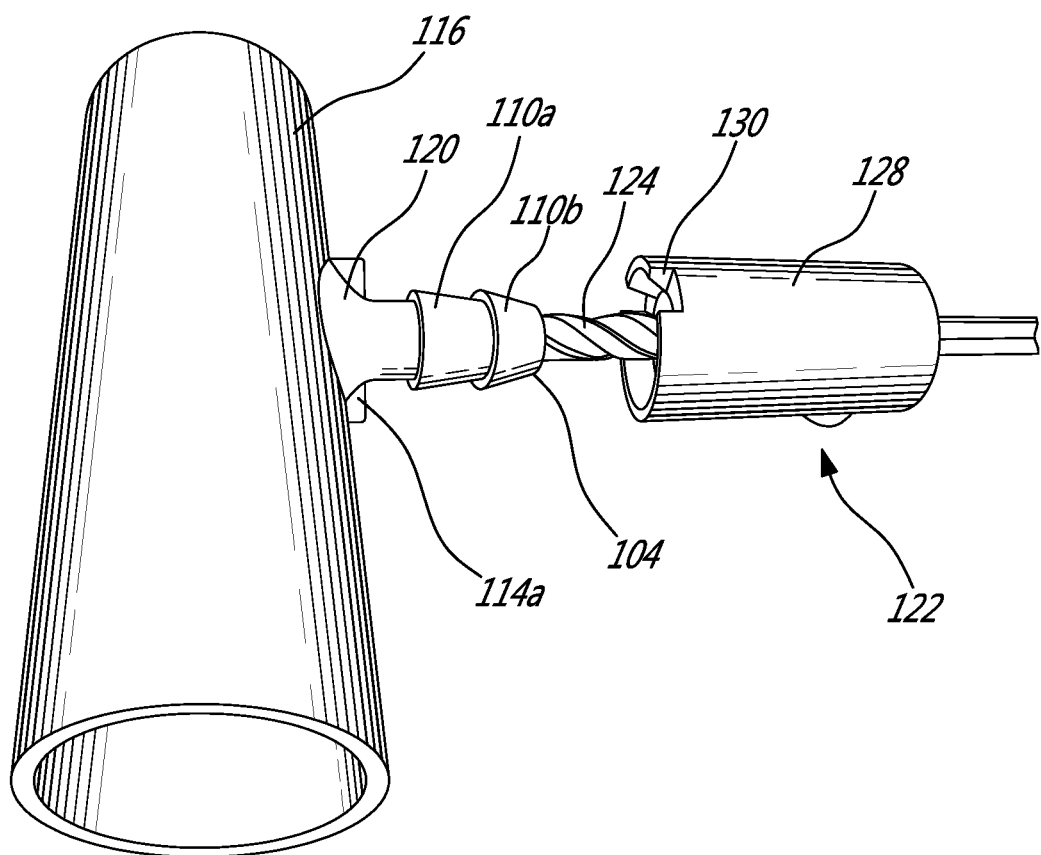
FIG. 8 is a perspective view of a drill end of a collared drill drilling through a channel in a fitting, in accordance with an embodiment of the present invention.
Figure 9:
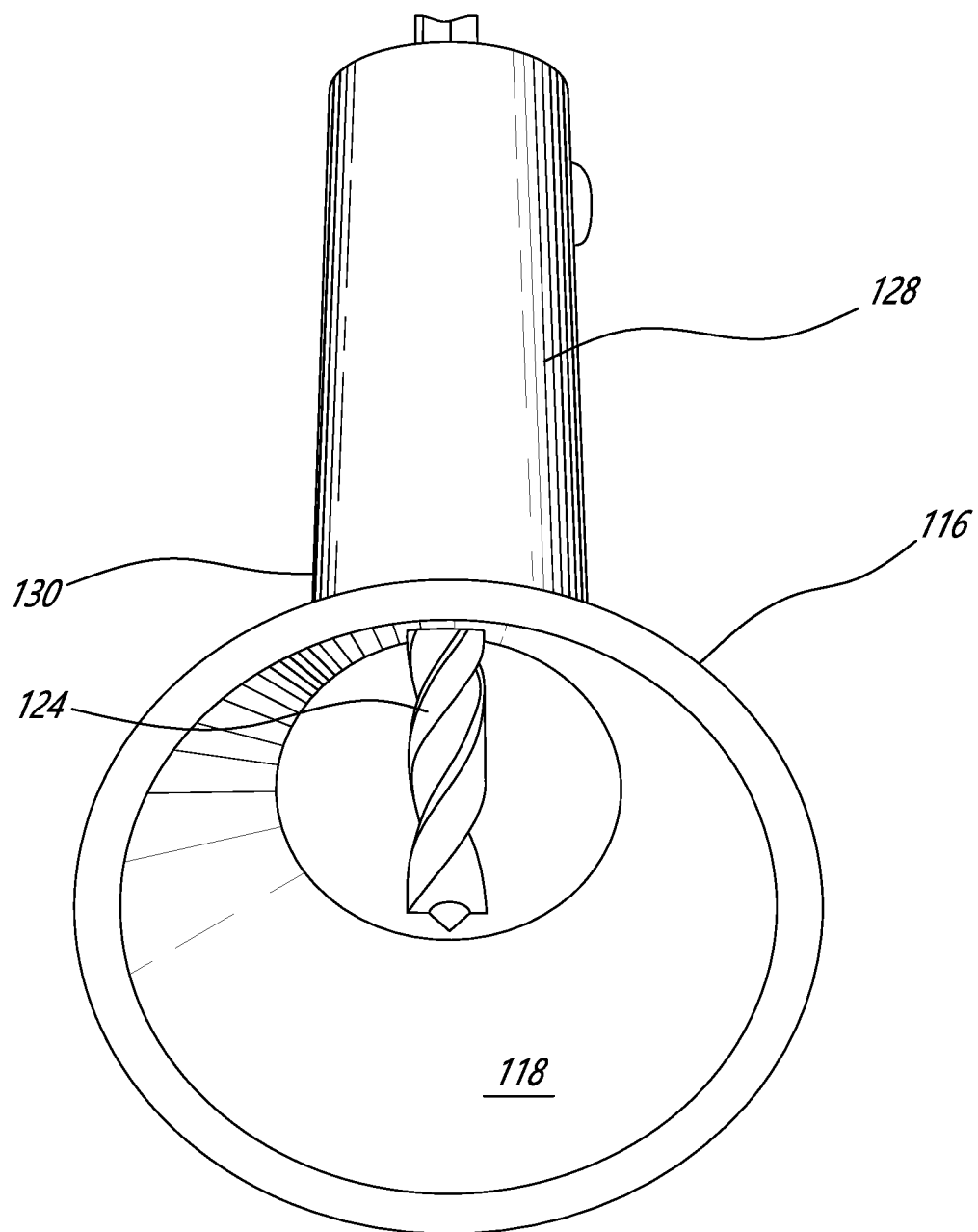
FIG. 9 is a perspective view of a drill end of a collared drill drilling through a mainline, and simultaneously cutting a flange from a fitting, in accordance with an embodiment of the present invention.

As FIG. 8 illustrates, mount end 126 of collared drill 122 is configured to be mounted in a standard cordless hand drill. The drill end 124 of the collared drill 122 is a standard twist drill. Drill end 124 of the collared drill 122 has a diameter that substantially matches a diameter of channel 142 in the fitting 102. In one embodiment, the drill end 124 rotatably engages narrow end 104 of the fitting 102 and passes through channel 142 and the mainline 116. The collar fits around, and rotates simultaneously with drill end 124. Irregular edge 130 of the collar is generally sharp, so as to enable cutting the flange 114a, 114b from wide end 108 of the fitting 102, as shown in FIG. 9, where flange 114a, 114b has been cut off wide end 108 of fitting 102.

Figure 10:
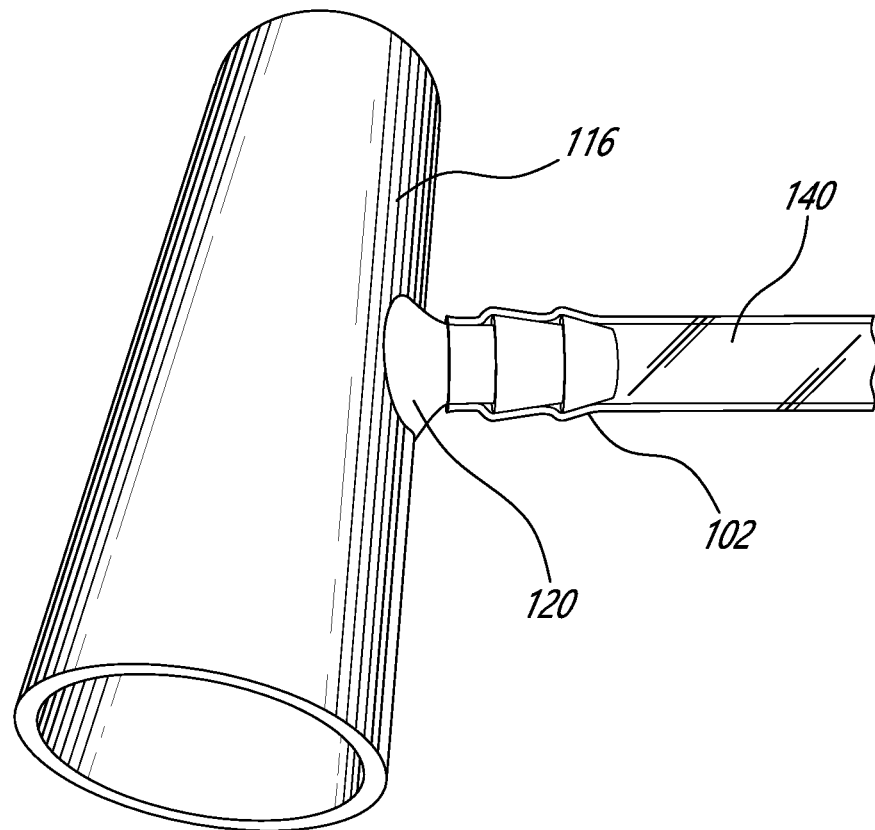
FIG. 10 is a perspective view of an exemplary lateral line coupling with a mainline, in accordance with an embodiment of the present invention.
Figure 11:
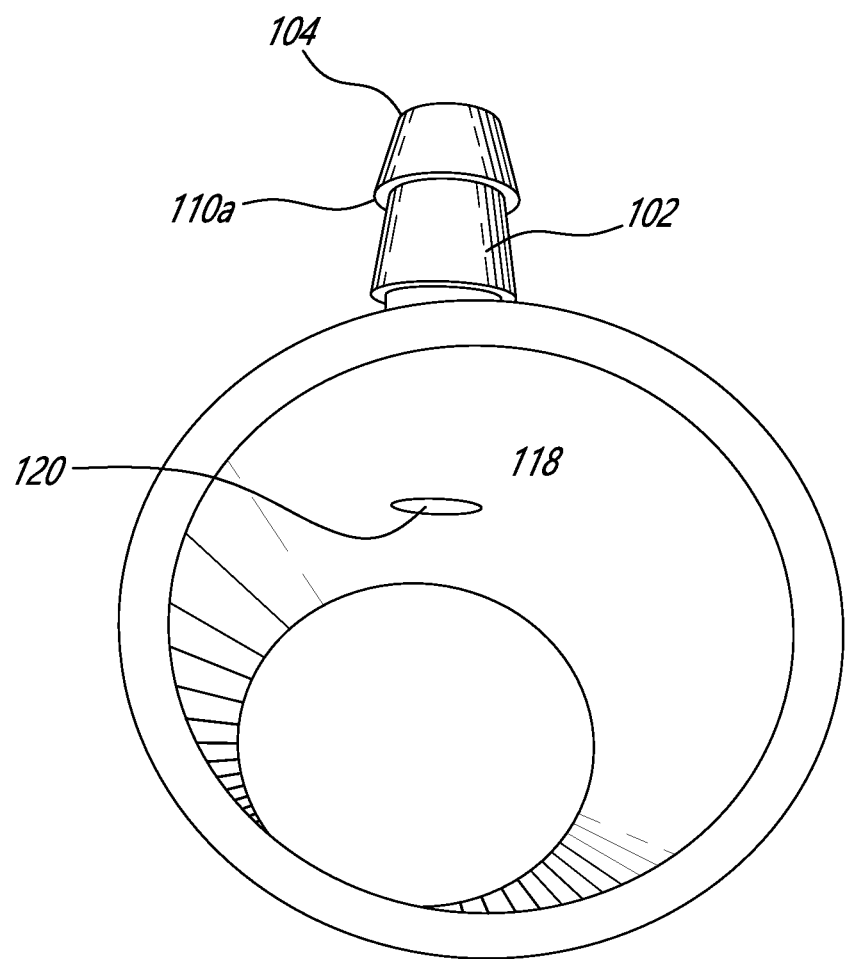
FIG. 11 is a perspective view of a smooth inner surface of a mainline after spin welding and drilling, in accordance with an embodiment of the present invention.

Looking now at FIG. 10, a final Step 218 comprises coupling a lateral line 140 to the narrow end 104 of the fitting 102, whereby an inside diameter of the lateral line 140 passes over the plurality of barbs 110a, 110b projecting from the elongated body 106 of the fitting 102. In this manner, an unobstructed fluid communication forms between mainline 116 and lateral line 140. As discussed above, the molten debris is dislodged by drilling through channel 142 with a collared drill 122. The drilling process leaves a smooth inner surface 118 of mainline 116, near the contact interface 120 (FIG. 11).

In alternative embodiments, method 200 may enable collection of sap by including a Step of inserting a spout into a tap hole of a maple tree, and coupling a drop line to the spout. A further Step may include coupling the lateral line to the drop line. These alternative steps may be useful when system 100 and method 200 is used to harvest sap from maple trees. However, system 100 and method 200 may be used in other aspects and for connecting lines in other industries and fields of operation.

One objective of the present invention is to provide a hermetic seal between a mainline 116 and a lateral line 140 for collection and transport of sap.

Another objective is to provide a one-piece thermoplastic fitting that is simply designed and inexpensive to manufacture.

Another objective is to provide an efficient spin welding method 200 that is simple and inexpensive to operate.

One advantage of the system 100 and method 200 is that fitting 102 is hermetically welded to mainline 116. It is known in the art that existing methods use multiple piece fittings which use an elastomer and mechanical clamping to provide a seal. This can loosen and leak over time. When vacuum is applied to the main line and collection system which is common practice to increase yield of sap collected, leaks are especially harmful. The leaking air interacts with sap in the main line and creates a Venturi effect and this lowers the temperature of the affected area and can freeze sap in the main line possibly blocking sap flow from hundreds of maple trees and reducing yield.

Another advantage of system 100 and method 200 is that the cost of the fitting 102 is less than current fittings and methods of coupling lines. This is due to the fact that much less material is used in its manufacture and the tooling is much simpler to produce the part.

Yet another advantage of system 100 and method 200 is that after the fitting 102 is installed on mainline 116, a smooth inner surface 118 with no protrusions forms in the mainline 116 (FIG. 11). Conversely, the prior art method forms a protrusion into the main line of up to ¼". This protrusion may be a site for debris to collect and microbial agents to grow. This undesirable protrusion also catches ice slugs in the main line which can cause blockage of sap flow.

Yet another advantage of system 100 and method 200 is that fitting can be repaired easily if damage occurs to barbs along the elongated body of fitting. The damaged barbs may be cut off flush at a fitting base and a new fitting installed directly over the damaged fitting using the same equipment and process used to install the original fitting. Conversely, the prior art method requires a large hole to be cut into the mainline before installation of a multi-part fitting. Thus, when damage occurs at the hole, leaks are difficult to repair and usually require cutting out a section of mainline and installing a repair fitting along with another multi part fitting at an undamaged new location on the main line.

Yet another advantage of system 100 and method 200 is that the fitting does not require cutting of mainline wire ties for installation. Mainlines usually are heavy, and thus require support from anchored steel support wires. The mainline is attached to the support wire by wire ties. Each wire tie must wrap around the mainline, and the support wire and must be twisted around the mainline forming a secure clamping action. These wire ties are placed every 6" along the mainline length and the mainline is held tightly against the support wire.

Furthermore, the prior art multi-part fitting, because of its need to fully encircle the mainline to provide a clamping action, must be slipped between the support wires and mainline 116 when installing the multi part fitting. This tight maneuvering requires cutting several wire ties at the installation location on the mainline in order to create a gap big enough to pass the multi-part fittings clamp through. In practical use most installers leave off most wire ties until the multi part fittings are installed and then install the remaining wire ties later, which adds an additional, time consuming step to the process. The present disclosure, however, utilizes a spin welded fitting that can be installed at any time with no interference from wire ties; thereby allowing the mainline installer to place all wire ties at once without a return trip.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A method for spin welding maple sap lines, the method comprising:
providing a fitting, whereby the fitting comprises a plurality of barbs projecting from an elongated body, each barb facing in a direction and being adapted for resisting axial movement of the fitting, the fitting defined by a narrow end, a wide end, and a concentrically disposed channel, the wide end comprising at least one flange and a protruding member configured to melt before the main body of the fitting;
closing a non-rotatable clamp radially into gripping contact with a mainline, whereby the mainline is at least partially deformed by the gripping contact;
inserting the fitting within a chuck, whereby the chuck is configured to rotate and transfer torque to the at least one flange of the fitting;
engaging the mainline with the protruding member of the fitting to define a contact interface between the mainline and the fitting, whereby the deformed configuration formed in the mainline by the non-rotatable clamp increases the surface area at the contact interface;
rotating the fitting relative to the mainline to heat and soften the protruding member of the fitting, whereby the contact interface between the fitting and the mainline frictionally melts;
ceasing rotation of the fitting and continuing fitting engagement with mainline after a first duration;
disengaging the chuck from the fitting after a second duration, whereby the fitting and the mainline are welded together;
drilling a hole through the channel of the fitting with a collared drill, the collared drill defined by a drill end, a mount end, and a collar having an irregular edge, whereby the drill end is configured to dislodge molten debris produced from heating and softening the protruding member whereby the irregular edge is configured to cut the flange from the wide end of the fitting and there is fluid communication between the fitting and the mainline; and
coupling a lateral line to the narrow end of the fitting, whereby an inner diameter of the lateral line passes over the plurality of barbs projecting from the elongated body of the fitting.

2. The method of claim 1, further including a step of inserting a spout into a tap hole of a maple tree and coupling a drop line to the spout.

3. The method of claim 1, further including a step of coupling the lateral line to the drop line.

4. The method of claim 1, wherein the material of the fitting includes at least one member selected from the group consisting of: a high density polyethylene, a medium density polyethylene, and a low density polyethylene.

5. The method of claim 1, wherein the elongated body of the fitting comprises an outer diameter of about ⅜ inch.

6. The method of claim 1, wherein the protruding member of the melt ring has a generally circular shape.

7. The method of claim 1, wherein the mainline and the lateral line are generally flexible.

8. The method of claim 1, wherein the inner diameter of the lateral line is between about 3/16 inch to 5/16 inch.

9. The method of claim 1, wherein the chuck comprises a power source.

10. The method of claim 1, wherein the chuck is configured to rotate at about 20,000 rotations per minute.

11. The method of claim 1, wherein the chuck comprises a sleeve, the sleeve defined by a ridge.

12. The method of claim 11, wherein the step of rotating the fitting relative to the mainline to heat and soften the protruding member of the fitting, further includes registering the ridge of the sleeve with the at least one flange of the fitting for transferring torque from the chuck to the fitting.

13. The method of claim 1, wherein the irregular edge of the collared drill is substantially sharp.

14. The method of claim 1, wherein the step of drilling a hole through the channel of the fitting with a collared drill, further comprises engaging the drill end of the collared drill with the narrow end of the fitting.

15. The method of claim 1, wherein the mainline comprises an inner surface.

16. The method of claim 15, wherein the inner surface of the mainline, proximal to the contact interface, is substantially smooth after the step of drilling a hole through the channel of the fitting with a collared drill.

17. The method of claim 1, wherein a diameter of the drill end of the collared drill is configured to substantially match a diameter of the channel in the fitting.

18. The method of claim 1, wherein the first duration, for the step of ceasing rotation of the fitting after a first duration, comprises about three seconds.

19. The method of claim 1, wherein the second duration, for the step of disengaging the chuck from the fitting after a second duration, comprises about three seconds.

* * * * *